United States Patent Office 3,232,955
Patented Feb. 1, 1966

3,232,955
PRODUCTION OF PHTHALIC ANHYDRIDE BY CATALYTIC OXIDATION
Helmut Nonnenmacher, Konstantin Andrussow, Max Appl, Anton Feinauer, and Juergen Haug, Ludwigshafen (Rhine), Alfred Helms, Ludwigshafen (Rhine)-Edigheim, and Klaus Wiebusch, Ludwigshafen (Rhine), Germany, assignors to Badische Anilin- & Soda-Fabrik Aktiengesellschaft, Ludwigshafen (Rhine), Germany
No Drawing. Filed Apr. 24, 1962, Ser. No. 189,701
Claims priority, application Germany, Apr. 28, 1961, B 62,309; B 62,310; Sept. 28, 1961, B 64,169; Nov. 30, 1961, B 64,993
9 Claims. (Cl. 260—346.4)

This invention relates to the production of phthalic anhydride. More specifically it relates to the use of catalysts which have not heretofore been used for the oxidation of naphthalene or xylene by means of air. This invention further relates to the novel catalysts used.

Prior to this invention it has been known that phthalic anhydride can be prepared by oxidation of naphthalene or of o-xylene with gases containing oxygen, especially air, at a temperature of between about 300° C. and 550° C., in the presence of catalysts. The catalyst may be installed in fixed position in the oxidation chamber or may be present in fluidized form. Many suitable catalysts have already been described having as their active component vanadium compounds. It has also been known to use the catalysts with or without carriers. Catalysts consisting of vanadium pentoxide, potassium pyrosulfate and silicic acid have proved to be suitable. Usually the active components, i.e., vanadium pentoxide, potassium pyrosulfate and, in some cases, potassium sulfate are applied to the carrier substances by impregnation from aqueous solutions. Catalysts have also been described in which the active components are applied to the carrier in the form of a potassium pyrosulfate melt containing vanadium pentoxide. Conventional catalysts have the following shortcomings: They can only be used either for the oxidation of naphthalene or for the oxidation of xylene. Especially in the oxidation of o-xylene, considerably smaller yields are obtained when carrying out the oxidation by the fluidized bed or fluidized flow method. Moreover, the prior art catalysts will not permit high loads of o-xylene (i.e., grams of o-xylene/liter of catalyst per hour) and give unsatisfactory yields if the oxygen-containing gas is supplied with high charges of xylene or naphthalene with reference to oxygen (grams of xylene or naphthalene/cubic meter (S.T.P.) of oxygen in the oxygen-containing gas). Furthermore, the prior art catalysts will not permit high loads in the fluidized bed without the catalyst falling off in activity after only a short time, so that side reactions (in the case of naphthalene, the formation of naphthoquinone) occur to a marked extent. Another disadvantage of the prior art catalysts is their sensitivity to sulfur compounds contained in coal tar naphthalene.

It is an object of this invention to provide a process for the production of phthalic anhydride in which the fluidized bed or fluidized flow technique is used and either o-xylene or naphthalene may be used as initial material. Another object of the invention is to provide catalysts which have not heretofore been used in the oxidation of o-xylene or naphthalene by fluidization methods. Still another object of the invention is to provide a process for the oxidation of o-xylene or naphthalene in which the gas may be given a high load of o-xylene for naphthalene. A further object of the invention is to provide a process for the production of phthalic anhydride in which the catalyst may be given a high load. Finally it is an object of this invention to provide a catalyst for air or oxygen oxidation of o-xylene or naphthalene which has little or no sensitivity to sulfur.

These and other objects are achieved by carrying out the oxydation of o-xylene or naphthalene to phthalic anhydride with oxygen or inert gases containing molecular oxygen at a temperature of 250° to 420° C. by the use of a fluidized catalyst which comprises a highly porous carrier material, especially silica gel having an inner surface of 200 to 400 m.$^2$ per gram and a grain size of 10 to 3,000 microns and which contains an active substance mixture of vanadium pentoxide, sodium pyrosulfate and potassium pyrosulfate, the melting point of the mixture of sodium and potassium pyrosulfate being lower than that of potassium pyrosulfate and the said active substance mixture being present in the pores of the carrier in fused form under the reaction conditions. The total amount of vanadium pentoxide-pyrosulfate melt should preferably be between 10 and 60% by weight of the catalyst, the melt containing 5 to 40% by weight of vanadium pentoxide with reference to the active substance mixture.

In the usual case the catalysts consist of these components only or of these components together with any of the additives enumerated below. However, a content of other inert materials, as for example materials of low porosity, such as quartz and calcined alumina, also falls within the scope of our invention.

The vanadium pentoxide may be replaced in part, for example up to 10%, by phosphoric acid and if desired molybdic and/or tungstic acid; the phosphoric acid proportion may be up to 4% by weight (calculated as phosphorus pentoxide) and the molybdic or tungstic acid proportion may be up to 6% by weight (calculated as $MoO_3$ or $WO_3$) with reference to the active substance mixture.

The catalyst used for the oxidation of o-xylene or naphthalene to phthalic anhydride may be prepared for example by applying a melt of alkali pyrosulfates in which the vanadium pentoxide is dissolved, if desired with additions, to carrier substances having a large surface and a big overall pore volume. They may also be prepared, however, by impregnating the carrier material with aqueous solutions which contain the active components, compounds which yield alkali pyrosulfates when heated, and if desired additions, drying the carrier thus treated and tempering it at 200° to 600° C., more specifically at 250° to 400° C., for example for 2 to 48 hours, until the active substance mixture in form of a pyrosulfate melt containing vanadium has formed in the pores of the carrier. It is a characteristic feature of catalysts for use in the practice of this invention that the active substance mixture of alkali pyrosulfate which contains vanadium and may include any other additions, is present in the pores of the catalyst support as a liquid melt under the conditions of the oxidation.

The large-surface carrier constitutes 40 to 90% by weight of the catalyst. Aluminum phosphate, synthetic or natural silicates, silicic acid, especially in the form of silica gel or active carbon may for example be used. Silica gel obtained as a granulate by precipitation of silica sol, subsequent drying, calcining and size reduction, is eminently suitable as a carrier for the catalyst. It should be free from iron. It is used in a grain size of 10 microns to 3,000 microns, especially from 20 to 600 microns and advantageously from about 20 to 150 microns; the inner surface should be about 200 to about 400 m.$^2$/g., preferably 300 to 360 m.$^2$/g., the mean pore radius should be about 50 to 60 A. and the total pore volume should be about 1 cm.$^3$/g. The large-surface carrier may also be used in the form of microbeads which can be obtained by spray-drying aqueous concentrates.

When active carbon having the grain size range of about 20 to 600 microns, the temperature in the production of the catalyst and in the oxidation should not as a rule exceed 300° to 340° C. because otherwise burning of the active carbon in the air stream will occur.

When the catalyst is prepared by applying the pyrosulfate melt containing the active components and the additives to the carrier, the melt may first be prepared for example in the following way: mixtures of the sodium pyrosulfate and potassium pyrosulfate or of sodium hydrogen sulfate and potassium hydrogen sulfate with or without water are heated and fused until the water has volatilized. Then at about 300° to 450° C., the vanadium compounds, especially vanadium pentoxide or ammonium vanadate, and if desired additives such as phosphoric acid, molybdic acid or tungstic acid or further additives are dissolved in the melt. It is also possible to use vanadium compounds which are converted into vanadium pentoxide under the reaction conditions, as for example vanadium (III) chloride, vanadium (III) oxide or vanadyl sulfate ($VOSO_4$). The amount of vanadium compound used is such that the melt contains 5 to 40% by weight of vanadium pentoxide. It is preferred to use melts of active substance which contain 10 to 25% by weight of vanadium pentoxide. If phosphoric acid is added, it may be used as such or in the form of phosphorus pentoxide or in the form of compounds which yield phosphoric acid. Thus it is possible to use phosphorus pentasulfide, ammonium phosphate, sodium phosphate or potassium phosphate as primary, secondary or tertiary phosphates. When using alkali phosphates, an amount of sulfuric acid equivalent to the alkali must be present, taken into account as pyrosulfate. The phosphorus compounds are added in such an amount that a maximum of 4% by weight of phosphorus pentoxide is present with reference to the fused active substance. It is of advantage for the weight ratio of phosphorus pentoxide to vanadium pentoxide to be between 1:6 and 1:200.

Molybdenum compounds, when added, may be in the form of molybdic acid, molybdenum oxide, molybdenum sulfide or ammonium molybdate. Sodium or potassium molybdate may, however, also be used or advantageously phosphomolybdic acid. The content of alkalies is preferably compensated for by adding sulfuric acid. The alkali and/or phosphorus content of the added molybdenum compounds should be taken into account in the amount of pyrosulfate or phosphoric acid.

Instead of molybdenum compounds, tungsten compounds may be added, for example tungstic acid, tungsten oxide, tungsten sulfide, ammonium tungstate or phosphotungstic acid. Mixtures of molybdenum compounds and tungsten may also be added. The molybdenum and/or tungsten compounds are added in such an amount that the proportion thereof in the active substance is up to 6% by weight of molybdenum trioxide (or an equivalent amount of tungsten trioxide), and the ratio of molybdenum oxide or tungsten oxide (or both) to vanadium oxide is advantageously between 1:3 and 1:20. The vanadium pentoxide may be activated by additions, for example of 1 to 10% by weight of silver oxide or copper oxide, with reference to vanadium pentoxide.

The ratio of potassium pyrosulfate to sodium pyrosulfate may be varied within wide limits. Good results are obtained by using mixtures of the two components wherein the ratio by weight of potassium pyrosulfate to sodium pyrosulfate is between 9:1 and 1:1. It is preferred to use the two components in ratios by weight of from 9:1 to 2.5:1, especially of from 17:3 to 13:7. These ratios correspond to a percentage of 10 to 50% by weight of sodium pyrosulfate with reference to the combined amount of potassium pyrosulfate and sodium pyrosulfate, or more specifically to 10 to 40% or 15 to 25%.

The total amount of vanadium pentoxide, of phosphoric acid, if any, and of the additions of molybdenum and/or tungsten oxide, and silver oxide or copper oxide, if any, should not amount to more than 40% by weight (calculated as oxides) of the active substance mixture. The total amount of active substance advantageously lies between 10 and 30% by weight.

Before applying the active substance mixture to the carrier it is advantageous to allow the melt to solidify and to comminute the solidified melt.

Various methods may be used for applying the active substance mixture of the pyrosulfate melts, which contain vanadium pentoxide and other additives, to the carrier substances. For example the solidified material may be ground to a grain size of about 200 microns or less, mixed in a mixing drum with the appropriate amount of silica gel carrier and then heated at 300° to 450° C. for several hours. The product which thus liquefies is absorbed by the pores of the carrier material. It is advantageous to keep the carrier in motion to effect uniform distribution of the melt. The operation may be carried out for example in a heated stirrer-filled vessel or in a heated screw conveyor. Another method comprises fluidizing the carrier material, for example silica gel, by means of air or an inert gas, for example nitrogen or carbon dioxide, and heating it to a temperature above the melting temperature of the pyrosulfate melt, mixing the powdered fused material with the carrier and maintaining the mixture in the fluidized state for some time, for example 2 to 24 hours, at a temperature above the melting temperature of the mixture of the two pyrosulfates or above the melting temperature of the active substance mixture thus being formed. To homogenize the catalyst it may be kept fluidized for some time prior to use in a current of air or other oxygen-containing gas at the reaction temperature.

The temperature at which impregnation is carried out is practically without influence on the activity of the catalyst.

The ratio of the active substance mixture to carrier may be varied within certain limits. In general at least 10% by weight of active substance mixture, with reference to the catalyst, is necessary; the upper limit for the proportion of the active substance mixture in the catalyst depends to a great extent on the type of carrier used. Too high a proportion of pyrosulfate ordinarily results in the catalyst granules leads agglomerating or sticking together. This will occur, for example, when a proportion of more than 60% by weight, with reference to the catalyst, is used together with silica gel as the carrier. It is preferred to use 25 to 50% by weight of active substance mixture with reference to the finished catalyst, especially when using silica gel.

If the supported catalyst is prepared by a wet method, i.e., by impregnating the carrier with aqueous solutions which contain vanadium with or without compounds containing phosphoric acid, molybdic acid and/or tungstic acid, solutions of appropriate composition are used as initial materials. The same numerical ratios hold good as with catalysts prepared by application of the melt. Sodium or potassium sulfate and sulfuric acid may be used instead of the pyrosulfates or the hydrogen sulfates. It is also possible to use sodium or potassium sulfates alone, without adding sulfuric acid, in the aqueous solution and to prepare the pyrosulfates and consequently the pyrosulfate melt from the sulfates by contacting the impregnated and dried catalysts with sulfur trioxide or organic or inorganic sulfur compounds yielding sulfur trioxide, for example thiophene, carbon disulfide or sulfur dioxide, while tempering them in the air current.

In accordance with the numerical ratios given above, the new catalysts have a composition within the following limiting values:

40 to 90% by weight of carrier substance, especially silica gel 6 to 57% by weight of a mixture of sodium and potassium pyrosulfate 0.5 to 24% by weight of $V_2O_5$ In the catalysts preferably used the limiting values are:

50 to 80% by weight of silica gel
7.5 to 54% by weight of sodium pyrosulfate and potassium pyrosulfate in the proportion of from 1:9 to 1:1
1.0 to 15% by weight of $V_2O_5$
0 to 2.5% by weight of $P_2O_5$
0 to 3.6% by weight of $MoO_3$
0 to 3.6% by weight of $WO_3$
0 to 1.5% by weight of $CuO$
0 to 1.5% by weight of $Ag_2O$ the sum of the values for $CuO$ and $Ag_2O$ being not more than one-tenth of the value for $V_2O_5$, the sum of the values for $P_2O_5$, $MoO_3$, $WO_3$, $CuO$ and $Ag_2O$ being not more than one-quarter of the value for $V_2O_5$, and the sum of the values for $V_2O_5$, $P_2O_5$, $MoO_3$, $WO_3$, $CuO$, $Ag_2O$ being not more than two-thirds of the value for the mixture of pyrosulfates.

The reaction conditions used in the oxidation of o-xylene or naphthalene to phthalic anhydride are the same as those used with the prior art catalysts.

Accordingly, 98% to 100% o-xylene may be used; xylene mixtures may also be used which contain up to 10% of m- and p-xylenes and/or ethylbenzene. The latter compounds largely burn to carbon dioxide or carbon monoxide under the reaction conditions. The o-xylene is introduced into the fluidized catalyst at the reaction temperature in an amount of 30 to 120 g./m.³ (S.T.P.) of air, which corresponds to 150 to 600 g. of xylene referred to 1 cubic meter (S.T.P.) of oxygen. The gas current containing xylene is obtained for example by saturating a branch current and mixing it with the main current, if desired by means of a current of auxiliary gas, for example nitrogen. The xylene-containing gas current may also be supplied separately from the oxygen-containing gas necessary for the reaction. The initial concentrations of xylene which correspond to the above values are between 0.6 and 2.5% by volume.

Crude napthalene with the melting point 77.0° to 79.5° C. may also be used as initial material. This crude naphthalene usually contains sulfurous impurities, for example thionaphthene, equivalent to a sulfur content of 0.1 to 1.0%. Naphthalene of a higher degree of contamination, for example crude naphthalene containing appreciable amounts of methylnaphthalene and/or anthracene and/or phenanthrene, for example the fraction having a boiling range of about 210° to 240° C. obtained in the distillation of tar or the pyrolysis of hydrocarbons, may also be used. The naphthalene does not require any special pretreatment and in particular it is not necessary to remove the sulfurous impurities prior to the reaction; nor is it necessary to separate polymerizable impurities in a separate pretreatment. On the other hand it is also possible to process pure naphthalene having a sulfur content of less than 0.1%.

The naphthalene is introduced into the fluidized catalyst maintained at the reaction temperature, for example in an amount of 30 to 150 g./m.³ (S.T.P.) of air equivalent to 150 to 750 g. of naphthalene per cubic meter (S.T.P.) of oxygen in the oxygen-containing gas. The naphthalene-containing gas current is obtained for example by saturating a branch current and mixing it with the main current, by evaporating the naphthalene into the gas current or by injecting it, in solid or liquid form, preferably by means of a current of auxiliary gas, for example nitrogen into the gas current. The naphthalene may also be introduced direct into the fluidized bed, separately from the oxygen-containing gases required for the reaction. When using air, the initial concentration of naphthalene may be up to 3% by volume, depending on the catalyst load. It is also possible to use mixtures of naphthalene and o-xylene.

Both with o-xylene and naphthalene, the oxidation temperature is at about 250° to 420° C., especially at 310° to 370° C. The rate of flow of the gases and vapors and the volume of the fluidized bed should be correlated so that contact times of 5 to 50 seconds, especially 5 to 40 seconds, are maintained. Good results are also obtained however with contact times of 3 seconds only, the contact time being defined as the time during which the initial material is in contact with the catalyst. For the purposes of calculating the contact time the space taken by the catalyst is assumed to be free of catalyst:

Contact time =
$$\frac{\text{volume of catalyst space}}{\text{volume of gas per second (related to pressure and temperature in catalyst space)}}$$

The process may be carried out at normal pressure, slightly increased pressure, for example up to 3 atmospheres, or at increased pressure, for example at 5 to 25 atmospheres.

The selectivity of the catalyst, i.e., the ratio of the mole percentage of phthalic anhydride to the mole percentage of combustion products (carbon dioxide and carbon monoxide) increases as the reaction temperatures fall. On the other hand the conversion of xylene or naphthalene decreases as the temperature falls.

It is a remarkable fact that when naphthalene is used the content of naphthoquinone does not appreciably increase when the oxidation is carried out at relatively low temperature, for example 320° to 340° C. On the other hand the conversion increases at higher reaction temperature, whereas the selectivity decreases. At oxidation temperatures above 350° C. the selectivity can be improved by carrying out the oxidation of o-xylene or naphthalene in the presence of small amounts, for example 0.5 to 2.5% by weight with reference to o-xylene or naphthalene, of sulfur, sulfur trioxide or sulfur compounds forming sulfur trioxide on the catalyst under the reaction conditions. The sulfur compounds or sulfur may be contained in the initial material from the start, for example in sulfur-containing naphthalene, or may be added. Thus sulfur dioxide or organic sulfur compounds, such as carbon disulfide or thiophene, may be added.

The catalyst is kept in fluidization in a quartz tube in a small plant and in a tube of iron or alloy steel, for example V2A-steel, in a larger plant.

The use of alloy steel is to be preferred to the use of iron because there is increased combustion of o-xylene to carbon dioxide and carbon monoxide when the oxidation is carried out in an iron tube. Distribution of the gas introduced at the lower end of the reaction tube, which may be contracted conically, may be carried out through a plate of ceramic or metallic sintered material or may be effected through an annular clearance produced by a conical insert. When small reactors are used, the heat may be removed through the wall of the reactor, for example by air cooling or by means of a salt melt; when units of larger size are used, it is necessary to install cooling coils within the fluidized bed. In this case the heat may be utilized for steam production.

The catalyst undergoes only very slight abrasion and remains active for long periods.

The invention is illustrated by, but not limited to, the following examples.

EXAMPLE 1

(a) Production of the catalyst 4,428 g. of potassium pyrosulfate ($K_2S_2O_7$) and 612 g. of sodium hydrogen sulfate ($NaHSO_4 \cdot H_2O$) are fused in a crucible furnace and kept at 340° C. for about an hour. To the melt, which contains 10% of sodium pyrosulfate and 90% of potassium pyrosulfate, there are added 1,080 g. of pure vanadium pentoxide while stirring, the melt then being heated for another hour at 350° C. After having been allowed to cool and solidify the melt, which contains 18% of vanadium pentoxide, is ground to a grain size of less than 150 microns.

5,900 g. of the powdered material is mixed in a mixing drum with 7,220 g. of grained silica gel having a grain size of 60 to 150 microns, an average pore diameter of about 54 A. units and an inner surface of about 360 m.² per gram and, while being constantly mixed, the mixture is heated within four hours to 350° C. in a vessel of V2A-steel and kept at this temperature for another four hours. After cooling, the ready-for-use catalyst is screened through a sieve having a mesh width of 200 microns. The catalyst is composed of 45% of vanadium-containing pyrosulfate melt as the active ingredient and 55% of silica gel.

(b) *Oxidation of xylene*

10.5 liters of the catalyst prepared under (a) is charged into an electrically heated vertical reaction tube of V2A-steel which has a diameter of 80 mm. and a length of 3,000 mm., filling up the tube to a height of 2,080 mm. The catalyst is heated to 340° C. In a vaporizer 52.6 g./h. of o-xylene is vaporized in an air stream of 600 liters (S.T.P.) per hour and the air stream laden with o-xylene vapor (87.5 g. of o-xylene per cubic meter (S.T.P.) of air) is passed through a preheater kept at 300° C. and then led through a sinter plate of V2A-steel into the reaction tube, where it fluidizes the catalyst. The temperature in the reaction chamber is maintained at 340° C. Any catalyst dust entrained by the gas current is retained by a filter consisting of wire netting and quartz wool, provided at the upper end of the reaction tube. The filter zone is kept at a temperature of between 200° and 250° C. (above the condensation point of phthalic anhydride). The gas mixture, which leaves the reaction tube after a contact time of 31 seconds, is cooled in an air-cooled tube 1,000 mm. in length and 50 mm. in diameter, phthalic anhydride separating in crystalline form.

The gas, cooled to 40° C., is washed twice with water, the residual phthalic anhydride and maleic anhydride being absorbed. Carbon dioxide, carbon monoxide and xylene are determined in the off-gas analytically. There are obtained per hour:

30.5 g. of phthalic anhydride (41.5 mole percent)
0.97 g. of maleic anhydride (1.0 mole percent)
49.3 liters (S.T.P.) of carbon dioxide and carbon monoxide (55.4 mole percent)
1.10 g. of residual xylene (2.1 mole percent)

The selectivity of the catalyst is therefore 0.75.

EXAMPLE 2

(a)

While proceeding as described in Example 1 a catalyst is prepared using 3,690 g. of potassium pyrosulfate and 1,525 g. of sodium hydrogen sulfate ($NaSHO_4 \cdot H_2O$) for the production of the alkali pyrosulfate melt. The melt obtained contains 25% of sodium pyrosulfate and 75% of potassium pyrosulfate; after the vanadium has been introduced, the melt contains 18% of vanadium pentoxide.

(b)

In the oxidation of the o-xylene under the conditions described in Example 1, there are obtained per hour:

36.3 g. of phthalic anhydride (49.4 mole percent)
1.07 g. of maleic anhydride (1.1 mole percent)
41.9 liters (S.T.P.) of carbon dioxide and carbon monoxide (47.1 mole percent)
1.26 g. of unreacted xylene (2.4 mole percent)

The selectivity is therefore 1.05.

(c) *Oxidation of naphthalene*

5.0 liters (3.4 kg.) of the catalyst prepared according to Example 2(a) is charged into a vertical reaction tube of V2A-steel 80 mm. in diameter and 2,500 mm. in length which is heated by a bath of molten niter. The tube is filled to a height of 1,000 mm. The catalyst is heated to 350° C. An air current laden with naphthalene vapor is preheated to reaction temperature and passed through a sinter plate of V2A-steel into the reaction tube, where it fluidizes the catalyst. Any catalyst dust entrained by the gas current is retained by a ceramic filter at the upper end of the reaction tube. The filter zone is kept at temperatures of between 200° and 250° C. (above the condensation point of phthalic anhydride). The gas mixture which leaves the reaction tube after a contact time of about 10 seconds is stripped of the bulk of the phthalic anhydride in an air-cooled tube 1,000 mm. in length and 50 mm. in diameter. The gas, cooled to 40° C., is then washed with water, the residual phthalic anhydride and the bulk of the maleic anhydride formed being absorbed. The solid product and the washing water are analyzed to ascertain their contents of phthalic anhydride, maleic anhydride and naphthoquinone.

The results obtained by the experiments set out under (α), (β) and (γ) hereinafter are average values from a ten days' operation in each case. The calculation of the mole percentage is based upon the fact that 1 mole of phthalic anhydride or maleic anhydride or naphthoquinone is formed from 1 mole of naphthalene.

(α) When using naphthalene having a sulfur content of 0.08% by weight at a rate of 85 g. per cubic meter of air (S.T.P.) and at a rate of 25 g. per kg. of catalyst per hour, the following yields are obtained at the temperatures indicated:

| Product obtained | Yield in mole percent obtained at— | | | |
|---|---|---|---|---|
| | 350° C. | 340° C. | 330° C. | 320° C. |
| Phthalic anhydride | 83 | 84 | 86 | 86 |
| Maleic anhydride | 1.8 | 1.5 | 1.4 | 1.2 |
| Naphthoquinone | 0.06 | 0.06 | 0.08 | 0.10 |

(β) At a constant temperature of 340° C. and with the rates of naphthalene being varied as indicated below, the results are:

| | | | |
|---|---|---|---|
| Amount in g. of naphthalene per m.³ (S.T.P.) of air | 85 | 100 | 138 |
| Amount in g. of naphthalene per kg. of catalyst per hour | 25 | 29.5 | 40.6 |
| Phthalic anhydride in mole percent | 84 | 84.5 | 82 |
| Maleic anhydride in mole percent | 1.5 | 1.5 | 1.4 |
| Naphthoquinone in mole percent | 0.06 | 0.08 | 0.12 |

(γ) When using commercial naphthalene having a solidifying point of 78.95° C. and a sulfur content of 0.47% by weight at the rates given under (α) above the following results are obtained:

| Product obtained | Yield of product in mole percent obtained at— | | | |
|---|---|---|---|---|
| | 350° C. | 340° C. | 330° C. | 320° C. |
| Phthalic anhydride | 79.5 | 81 | 83 | 83 |
| Maleic anhydride | 1.6 | 1.6 | 1.3 | 1.1 |
| Naphthoquinone | 0.08 | 0.08 | 0.11 | 0.12 |

EXAMPLE 3

While proceeding as described in Example 1 an alkali pyrosulfate melt is prepared from 985 g. of potassium pyrosulfate and 4,890 g. of sodium hydrogen sulfate. To the melt, composed of 80% of sodium pyrosulfate and 20% of potassium pyrosulfate, vanadium is added at a rate that the catalyst contains 18% of vanadium pentoxide.

In the oxidation of o-xylene under the conditions described in Example 1, the following yields are obtained per hour:

17.3 g. of phthalic anhydride (23.6 mole percent)
1.36 g. of maleic anhydride (1.4 mole percent)
27.2 liters (S.T.P.) of carbon dioxide and carbon monoxide (30.5 mole percent)

The selectivity is therefore 0.77.

EXAMPLE 4

1,020 g. of vanadium pentoxide and 60 g. of silver oxide are dissolved in a pyrosulfate melt prepared from 3,690 g. of potassium pyrosulfate and 1,525 g. of sodium hydrogen sulfate in a manner analogous to that described in Example 1. The pyrosulfate melt in which the ratio of sodium pyrosulfate to potassium pyrosulfate is 1:3, contains 17% of vanadium pentoxide and 1% of silver oxide.

5,900 g. of this melt is made into a catalyst with 7,220 g. of a silica gel of the type used in Example 1 by the method of this same example. The catalyst contains 45% of active substance and 55% of silica gel.

When this catalyst is used for the oxidation of o-xylene under the conditions described in Example 1 the following results are obtained:

36.8 g. of phthalic anhydride (50.1 mole percent)
1.08 g. of maleic anhydride (1.1 mole percent)
41.4 liters (S.T.P.) of carbon dioxide and carbon monoxide (46.5 mole percent)
1.21 g. of unreacted xylene (2.3 mole percent)
The selectivity is 1.08.

EXAMPLE 5

A catalyst prepared according to Example 2 is used for the oxidation of o-xylene under the conditions described in Example 1(b), i.e., at 340° C., but with 1% of sulfur dioxide added to the gas stream. After 50 hours, the yield of phthalic anhydride falls from 49.4 to 48 mole percent and after 100 hours to 30.1 mole percent, and the xylene conversion falls from 97.6% to 90% and 75%, respectively.

On the other hand, if the oxidation is carried out at 360° C., while using the same conditions, with the exception that 900 liters (S.T.P.) of air per hour containing 87.5 g. of xylene per cubic meter (S.T.P.) is supplied to the catalyst and at the same time 1% of sulfur dioxide is added, a yield of 48.8 mole percent of phthalic anhydride is obtained with a xylene conversion of 95.2% even after a reaction period of 100 hours. If no addition of sulfur dioxide is made, the xylene conversion rises to 99%, but the yield of phthalic anhydride falls to 34.4 mole percent after 50 hours.

EXAMPLE 6

1,080 g. of vanadium pentoxide is suspended in 5 liters of water and brought into solution at a temperature of 80° to 90° C. by adding 3,000 g. of crystallized oxalic acid in portions, blue vanadyl oxalate being formed. The resulting solution is mixed with a solution of 3,950 g. of potassium hydrogen sulfate ($KHSO_4$) and 1,525 g. of sodium hydrogen sulfate ($NaHSO_4 \cdot H_2O$) in 25 liters of water.

7,340 g. of silica gel of the type used in Example 1 is changed to an electrically heated reactor of V2A-steel 200 mm. in diameter and 1,600 mm. in length. An air stream, which has been preheated to 380° to 400° C., is introduced into the reactor, at a rate of 3 m.²/h., through an annular clearance produced by a conical insert, and fluidizes the silica gel. At a point 100 mm. above the air supply the reactor is provided with a water-cooled feed pipe which is introduced laterally into and extends to the middle of the reactor. Through the feed pipe 3 liters per hour of the solution described in the first paragraph of this example, containing vanadium and alkali hydrogen sulfates, is introduced by a metering pump into the fluidized bed. The preheating of the air and the heating of the reactor are correlated so that a temperature of 350° C. is maintained in the fluidized bed. The reactor is provided at its upper end with a dust filter of ceramic material. After all the solution has been fed in, the catalyst is kept in fluidized motion for another four hours, at the said temperature and a preheated stream of air is passed through the feed pipe to avoid clogging at a rate of 200 liters (S.T.P.) per hour. Clogging of the feed pipe is avoided in a similar manner prior to the introduction of the vanadium-alkali hydrogen sulfate solution.

10.5 liters of the catalyst thus prepared are used for the production of phthalic anhydride in a reactor in the manner and under the reaction conditions described in Example 1. The following yields are obtained per hour:

36.4 g. of phthalic anhydride (49.6 mole percent)
1.07 g. of maleic anhydride (1.1 mole percent)
42 liters (S.T.P.) of carbon dioxide and carbon monoxide (47.2 mole percent)
1.1 g. of unreacted xylene (2.1 mole percent)

The selectivity is therefore 1.05.

EXAMPLE 7

(a) Production of the catalyst 3,675 g. of potassium pyrosulfate ($K_2S_2O_7$) and 1,525 g. of sodium hydrogen sulfate ($NaHSO_4 \cdot H_2O$) are fused in a crucible furnace. 1,080 g. of pure vanadium pentoxide and 32 g. of ammonium hydrogen phosphate (($NH_4)_2HPO_4$) are introduced into the melt at 340° C. while stirring. After all has been introduced, the mixture is heated for a further hour at 350° C. After the melt containing 18% of vanadium pentoxide and 0.29% of phosphorus pentoxide has been cooled and solidified, it is ground to a grain size of less than 150 microns.

5,900 g. of the powdered material is mixed in a mixing drum with 7,220 g. of silica gel of the type used in Example 1 and the mixture is heated, while constantly mixing it, to 350° C. over a period of four hours in a V2A-steel reactor and keep at the said temperature for another four hours. After having been cooled, the finished catalyst which is composed of 45% of active substance, i.e., pyrosulfate melt containing vanadium and phosphorus pentoxide and of 55% of silica gel is screened through a sieve having a mesh size of 200 microns.

(b) Oxidation of xylene 10.5 liters of the catalyst prepared by the method described under (a) is charged to an electrically heated vertical reactor of V2A-steel 80 mm. in diameter and 3,000 mm. in length. The tube is filled to a height of 2,080 mm. The catalyst is heated to 340° C. 52.6 g. of o-xylene per hour are vaporized in a vaporizer in a stream of air of 600 liters (S.T.P.) per hour. This air stream which carries o-xylene in an amount of 87.5 g. per cubic meter (S.T.P.) is passed through a preheater kept at 300° C. and a sinter plate of V2A-steel into the reactor fluidizing the catalyst therein. The temperature in the reaction chamber is 330° C. A filter consisting of wire netting and quartz wool is provided at the top of the reactor to retain entrained catalyst dust. The filter zone is kept at a temperature between 200° and 250° C. (above the condensation point of phthalic anhydride). The gas mixture which leaves the reaction tube after a contact time of 31.5 seconds is cooled in an air-cooled tube 1,000 mm. in length and 50 mm. in diameter, phthalic anhydride separating in crystalline form.

The gas, cooled to 40° C., is washed twice with water so that the residual phthalic anhydride and the maleic anhydride are absorbed. Carbon dioxide, carbon monoxide and xylene are determined analytically in the off-gas.

The yields hourly obtained are:

39.3 g. of phthalic anhydride (53.8 mole percent)
0.98 g. of maleic anhydride (1.0 mole percent)
37.9 liters (S.T.P.) of carbon dioxide and carbon monoxide (42.7 mole percent)
1.31 g. of unreacted xylene (2.5 mole percent)

The selectivity is therefore 1.26.

If no ammonium phosphate is added in the production of the catalyst and, to make up for it, the proportion of potassium pyrosulfate is increased from 3,675 to 3,690 g., the following hourly yields are obtained under otherwise the same conditions:

36.3 g. of phthalic anhydride (42.4 mole percent)
1.07 g. of maleic anhydride (1.1 mole percent)
41.9 liters (S.T.P.) of carbon dioxide and carbon monoxide (47.1 mole percent)
1.26 g. of unreacted xylene (2.4 mole percent)

The selectivity is therefore 1.05.

EXAMPLE 8

A melt is prepared in a manner analogous to that described in Example 7(a) from 3,525 g. of potassium pyrosulfate ($K_2S_2O_7$), 1,465 g. of sodium hydrogen sulfate ($NaHSO_4.H_2O$), 1,080 g. of vanadium pentoxide, 32 g. of ammonium hydrogen sulfate and 210 g. of molybdic acid ($H_2MoO_4$). This melt has the following composition:

18.0% of $V_2O_5$
0.29% of $P_2O_5$
3.11% of $MoO_3$
58.9% of $K_2S_2O_7$
19.7% of $Na_2S_2O_7$

The ratio of sodium pyrosulfate to potassium pyrosulfate is 1:3, while the ratio of $P_2O_6$ to $V_2O_5$ to $MoO_3$ is 1.6:100.17.2.

From 5,900 g. of this melt and 7,220 g. of silica gel of the type used in Example 1 a catalyst is prepared in the manner described in Example 7(a).

When this catalyst is used for the oxidation of o-xylene as described in Example 7(b) at an oxidation temperature of 300° C. and with a contact time of 32 seconds, the following results are obtained:

42.1 g. of phthalic anhydride (57.3 mole percent)
1.11 g. of maleic anhydride (1.15 mole percent)
34.7 liters (S.T.P.) of carbon dioxide and carbon monoxide (39.0 mole percent)
1.38 g. of unreacted xylene (2.65 mole percent)

The selectivity is 1.47.

EXAMPLE 9

In a manner analogous to that described in Example 7(a), a melt is prepared from 3,527 g. of potassium pyrosulfate, 1,463 g. of sodium hydrogen sulfate, 1,080 g. of vanadium pentoxide, 32 g. of ammonium hydrogen phosphate and 198 g. of tungsten trioxide ($WO_3$).
This melt has the following composition:

18.0% of $V_2O_5$
0.29% of $P_2O_5$
3.31% of $WO_3$
58.8% of $K_2S_2O_7$
19.6% of $Na_2S_2O_7$

The ratio of sodium pyrosulfate to potassium pyrosulfate is 1:3, while the ratio of $P_2O_5$ to $V_2O_5$ to $MoO_3$ is 1.6:100:17.2.

From 5,900 g. of this melt and 7,220 g. of silica gel a catalyst is prepared in the manner described in Example 7(a).

By using this catalyst for the oxidation of o-xylene as described in Example 7(b) at an oxidation temperature of 310° C. and with a contact time of 32 seconds, the following results are obtained per hour:

40.6 g. of phthalic anhydride (55.4 mole percent)
0.88 g. of maleic anhydride (0.9 mole percent)
36.5 liters (S.T.P.) of carbon dioxide and carbon monoxide (41.15 mole percent)
1.37 g. of unreacted xylene (2.6 mole percent)

The selectivity is 1.33.

EXAMPLE 10

In a manner analogous to that described in Example 7(a) a melt is prepared from 3,935 g. of potassium pyrosulfate, 1,418 g. of sodium hydrogen sulfate, 1,080 g. of vanadium pentoxide, 39 g. of ammonium hydrogen phosphate, 252 g. of molybdic acid and 20 g. of silver nitrate.
The melt has the following composition:

18.0% of $V_2O_5$
0.33% of $P_2O_5$
3.51% of $MoO_3$
0.21% of $Ag_2O$
61.3% of $K_2S_2O_7$
17.8% of $Na_2S_2O_7$

The ratio of sodium pyrosulfate to potassium pyrosulfate is 1:3.45, while the ratio of $P_2O_5$ to $V_2O_5$ to $MoO_3$ is 1.95:100:20.7.

From 5,900 g. of this melt and 7,220 g. of silica gel a catalyst is prepared by the method described in Example 7(a).

By using this catalyst for the oxidation of o-xylene as in Example 7(b) at an oxidation temperature of 300° C. and with a contact time of 32 seconds, the following hourly results are obtained:

42.3 g. of phthalic anhydride (57.7 mole percent)
0.98 g. of maleic anhydride (1.0 mole percent)
35.9 liters (S.T.P.) of carbon dioxide and carbon monoxide (40.3 mole percent).
0.53 g. of unreacted xylene (1.0 mole percent)

The selectivity is 1.43.

EXAMPLE 11

When pure naphthalene having a sulfur content of less than 0.08% by weight is processed by the method described in Example 2(c), at a reaction temperature of 340° C. in the presence of the catalyst according to Example 10, the following results are obtained in dependence on the amount of naphthalene used per cubic meter of air and per each kg. of the catalyst:

| | | | |
|---|---|---|---|
| Amount in g. of naphthalene per cubic meter (S.T.P.) of air | 85 | 101 | 136 |
| Amount in g. of naphthalene per kg. of catalyst per hour | 25.0 | 29.8 | 40.1 |
| Mole percent of phthalic anhydride | 90 | 89 | 86 |
| Mole percent of maleic anhydride | 1.8 | 1.8 | 1.6 |
| Mole percent of napthoquinone | 0.02 | 0.05 | 0.08 |

EXAMPLE 12

When carrying out the oxidation of o-xylene in the presence of a catalyst prepared from 4,920 g. of potassium pyrosulfate and 1,080 g. of vanadium pentoxide only, otherwise working as in Example 1 with the temperature being 340° C., the following hourly yields are obtained:

28.1 g. of phthalic anhydride (38.3 mole percent)
0.83 g. of maleic anhydride (0.85 mole percent)
52.6 liters (S.T.P.) of carbon dioxide and carbon monoxide (59.2 mole percent)
0.87 g. of unreacted xylene (1.65 mole percent)

The selectivity is therefore only 0.65.

If this catalyst is used for the oxidation of naphthalene under conditions stated in Example 2(c), the following results are obtained:

(α) When using pure naphthalene with a sulfur content of 0.08% by weight at a rate of 85 g. per cubic meter (S.T.P.) of air and at a rate of 25 g. per kg. of catalyst per hour the following results are obtained at the temperatures indicated:

| Product obtained | Yield in mole percent of product at: | | | |
|---|---|---|---|---|
| | 350° C. | 340° C. | 330° C. | 320° C. |
| Phthalic anhydride | 83 | 83 | 77 | 69 |
| Maleic anhydride | 5.5 | 5.0 | 4.6 | 3.5 |
| Naphthoquinone | 0.5 | 1.7 | 4.5 | 7.2 |

(β) When processing pure naphthalene at a constant temperature of 340° C. but at increasing rates per cubic meter of air and per kg. of catalyst, the following values are obtained:

| | | | |
|---|---|---|---|
| Amount in g. of naphthalene per cubic meter (S.T.P.) of air | 85 | 100 | 136 |
| Amount of catalyst in g. of naphthalene per kg. of catalyst per hour | 25 | 29.5 | 40.1 |
| Phthalic anhydride in mole percent | 83 | 79 | 73 |
| Maleic anhydride in mole percent | 5.0 | 4.9 | 4.9 |
| Naphthoquinone in mole percent | 1.7 | 3.2 | 5.6 |

(γ) When using technical-grade naphthalene with a solidifying point of 78.95° C. and a sulfur content of 0.47% by weight under the conditions specified under (α) above, the following values are obtained:

| Product obtained | Yield in mole percent of product at: | | |
|---|---|---|---|
| | 350° C. | 340° C. | 330° C. |
| Phthalic anhydride | 79 | 78 | 70 |
| Maleic anhydride | 4.8 | 4.7 | 3.2 |
| Naphthoquinone | 0.7 | 2.4 | 6.5 |

What we claim is:

1. A process for the catalytic vapor phase oxidation of o-xylene to phthalic anhydride which comprises leading a gas containing molecular oxygen together with 150 to 600 g. of the o-xylene per cubic meter (S.T.P.) of oxygen over a finely divided catalyst in fluidized form at a temperature of 250° to 420° C., said catalyst comprising a mixture, being in a liquid molten condition at the reaction temperature, of vanadium pentoxide, sodium pyrosulfate and potassium pyrosulfate as active constituents with a ratio by weight of sodium pyrosulfate to potassium pyrosulfate of about 1:9 to 1:1 and a highly porous inert carrier material with an inner surface of 200 to 400 square meters per gram and a grain size of 10 to 3,000 microns as a carrier for the molten mixture, said molten mixture constituting 10 to 60% of the total catalyst and containing 5 to 40% of vanadium pentoxide with reference to the amount of said molten mixture of active constituents.

2. A process for the catalytic vapor phase oxidation of o-xylene to phthalic anhydride which comprises leading a gas containing molecular oxygen together with 150 to 600 g. of the o-xylene per cubic meter (S.T.P.) of oxygen over a finely divided catalyst in fluidized form at a temperature of 250° to 420° C., said catalyst comprising a mixture, being in a liquid molten condition at the reaction temperature, of vanadium pentoxide, sodium pyrosulfate and potassium pyrosulfate as active constituents with a ratio by weight of sodium pyrosulfate to potassium pyrosulfate of about 1:9 to 1:1 and a highly porous inert carrier material with an inner surface of 200 to 400 square meters per gram and a grain size of 10 to 3,000 microns as a carrier for the molten mixture, said molten mixture constituting 10 to 60% by weight of the total catalyst and containing from 5 to 30% by weight of vanadium pentoxide and from 0.1 to 10% by weight of an oxide additive, the percentages of vanadium pentoxide and oxide additive being with reference to the amount of said molten mixture of active constituents, said additive being at least one oxide selected from the group consisting of phosphorous pentoxide, molybdenum trioxide, tungsten trioxide, copper oxide and silver oxide with the proviso that the amount of phosphorous pentoxide is limited to not more than about 4% by weight with reference to said molten mixture, the sum of the molybdenum trioxide and tungsten trioxide is limited to not more than about 6% by weight with reference to the molten mixture and the sum of the copper oxide and silver oxide is limited to not more than about 10% by weight with reference to the vanadium pentoxide.

3. A process for the catalytic vapor phase oxidation of o-xylene to phthalic anhydride, which comprises leading a gas containing molecular oxygen together with 150 to 600 grams of the o-xylene per cubic meter (S.T.P.) of oxygen and 0.5 to 2.5% by weight of sulfur trioxide, with reference to said o-xylene, over a finely divided catalyst in fluidized form at a temperature of 350° to 420° C., said catalyst comprising a mixture, being in a liquid molten condition at the reaction temperature, of vanadium pentoxide, sodium pyrosulfate and potassium pyrosulfate as active constituents with a ratio by weight of sodium pyrosulfate to potassium pyrosulfate of about 1:9 to 1:1 and a highly porous inert carrier material with an inner surface of 200 to 400 square meters per gram and a grain size of 10 to 3,000 microns as a carrier for the molten mixture, said molten mixture constituting 10 to 60% of the total catalyst and containing 5 to 40% of vanadium pentoxide with reference to the amount of said molten mixture of active constituents.

4. A process for the catalytic vapor phase oxidation of o-xylene to phthalic anhydride, which comprises leading a gas containing molecular oxygen together with 150 to 600 grams of the o-xylene per cubic meter (S.T.P.) of oxygen and 0.5 to 2.5% by weight of sulfur trioxide, with reference to said o-xylene, over a finely divided catalyst in fluidized form at a temperature of 350° to 420° C., said catalyst comprising a mixture, being in a liquid molten condition at the reaction temperature, of vanadium pentoxide, sodium pyrosulfate and potassium pyrosulfate as active constituents with a ratio by weight of sodium pyrosulfate to potassium pyrosulfate of about 1:9 to 1:1 and a highly porous inert carrier material with an inner surface of 200 to 400 square meters per gram and a grain size of 10 to 3,000 microns as a carrier for the molten mixture, said molten mixture constituting 10 to 60% by weight of the total catalyst and containing from 5 to 30% by weight of vanadium pentoxide and from 0.1 to 10% by weight of an oxide additive, the percentages of vanadium pentoxide and oxide additive being with reference to the amount of said molten mixture of active constituents, said additive being at least one oxide selected from the group consisting of phosphorous pentoxide, molybdenum trioxide, tungsten trioxide, copper oxide and silver oxide with the proviso that the amount of phosphorous pentoxide is limited to not more than about 4% by weight with reference to said molten mixture, the sum of the molybdenum trioxide and tungsten trioxide is limited to not more than about 6% by weight with reference to the molten mixture, and the sum of the copper oxide and silver oxide is limited to not more than about 10% by weight with reference to the vanadium pentoxide.

5. A process as claimed in claim 2 wherein the molten mixture of active constituents consists essentially of vanadium pentoxide, sodium pyrosulfate, potassium pyrosulfate and silver oxide.

6. A process as claimed in claim 2 wherein the molten mixture of active constituents consists essentially of vanadium pentoxide, sodium pyrosulfate, potassium pyrosulfate and silver oxide.

7. A process as claimed in claim 2 wherein the molten mixture of active constituents consists essentially of vanadium pentoxide, sodium pyrosulfate, potassium pyrosulfate, molybdenum trioxide and phosphorous pentoxide.

8. A process as claimed in claim 2 wherein the molten mixture of active constituents consists essentially of vanadium pentoxide, sodium pyrosulfate, potassium pyrosulfate, tungsten trioxide and phosphorous pentoxide.

9. A process as claimed in claim 2 wherein the molten mixture of active constituents consists essentially of vanadium pentoxide, sodium pyrosulfate, potassium pyrosulfate, molybdenum trioxide, silver oxide and phosphorous pentoxide.

References Cited by the Examiner
UNITED STATES PATENTS

| | | | |
|---|---|---|---|
| 2,574,511 | 11/1951 | Toland | 260—346.4 |
| 2,674,582 | 4/1954 | Darby | 252—456 |
| 2,769,018 | 10/1956 | West | 260—385 |
| 2,809,939 | 10/1957 | Dixon et al. | 252—456 |
| 2,930,802 | 3/1960 | Aries | 260—346.4 |
| 2,942,005 | 6/1960 | Brown et al. | 260—346.4 |
| 2,973,371 | 2/1961 | Chomitz et al. | 260—346.4 |
| 3,038,911 | 6/1962 | Berets et al. | 260—346.4 |

NICHOLAS RIZZO, *Primary Examiner.*
IRVING MARCUS, WALTER A MODANCE,
*Examiners.*